United States Patent
Pellerin et al.

(10) Patent No.: US 7,044,188 B2
(45) Date of Patent: May 16, 2006

(54) APPARATUS FOR MOUNTING AND INFLATING A TIRE AND WHEEL ASSEMBLY

(75) Inventors: Dan Pellerin, Howell, MI (US); Chad A. Sinke, Hartland, MI (US); Brian Hoy, Brighton, MI (US)

(73) Assignee: Dürr Systems, Inc., Plymouth, MI (US)

( * ) Notice: Subject to any disclaimer, the term of this patent is extended or adjusted under 35 U.S.C. 154(b) by 136 days.

(21) Appl. No.: 10/866,921

(22) Filed: Jun. 14, 2004
(Under 37 CFR 1.47)

(65) Prior Publication Data

US 2005/0006031 A1    Jan. 13, 2005

Related U.S. Application Data

(60) Provisional application No. 60/477,882, filed on Jun. 12, 2003.

(51) Int. Cl.
*B60C 25/132*   (2006.01)

(52) U.S. Cl. ..................... 157/1.17; 157/1.24
(58) Field of Classification Search .............. 157/1.17, 157/1.2, 1.22, 1.24
See application file for complete search history.

(56) References Cited

U.S. PATENT DOCUMENTS

| | | |
|---|---|---|
| 3,675,705 A | 7/1972 | Corless |
| 3,786,852 A | 1/1974 | Houston |
| 3,805,871 A | 4/1974 | Corless |
| 4,061,173 A | 12/1977 | Daly |
| 4,262,727 A | 4/1981 | Schifferly |
| 4,263,958 A | 4/1981 | Corless |
| 4,673,016 A | 6/1987 | Damman et al. |
| 4,735,250 A | 4/1988 | Kane |
| 4,744,402 A | 5/1988 | St-Hilaire |
| 4,765,387 A | 8/1988 | Mannen |
| 4,811,774 A | 3/1989 | Dale et al. |
| 4,840,215 A | 6/1989 | Vijay et al. |
| 5,056,576 A | 10/1991 | Iori |
| 5,094,284 A | 3/1992 | Curcuri |
| 5,141,040 A | 8/1992 | Curcuri |
| 5,170,828 A | 12/1992 | Curcuri |
| 5,222,538 A | 6/1993 | Tomita et al. |
| 5,224,532 A | 7/1993 | Kawabe et al. |
| 5,287,907 A | 2/1994 | Kawabe et al. |
| 5,339,880 A | 8/1994 | Kawabe et al. |
| 5,657,673 A * | 8/1997 | Fukamachi et al. ........ 157/1.17 |

(Continued)

FOREIGN PATENT DOCUMENTS

JP    50-104302    8/1975

*Primary Examiner*—David B. Thomas
(74) *Attorney, Agent, or Firm*—Howard & Howard (57) ABSTRACT

An apparatus (10) of the present invention is designed for assembling and inflating a tire (12) mounted on a wheel (18). A tool (36) of the apparatus (10) rotates around the tire (12) for forcing one of the beads of the tire (12) between the seats of the wheel (18). Inner (72) and outer (74) concentric members are operably connected relative to one another for inflating the tire (12) mounted about the wheel (18). An activator (102) is connected to the outer concentric member (74) for moving the outer concentric member (74) telescopingly relative to the inner concentric member (72) to form a fluid passage (104). A carriage mechanism (40) is connected, to the inner (72) and outer (74) concentric members for reversibly moving the same between an isolated position (42) and the tool (36).

31 Claims, 5 Drawing Sheets

U.S. PATENT DOCUMENTS

| | | |
|---|---|---|
| 6,029,716 A | 2/2000 | Hawk |
| 6,125,904 A | 10/2000 | Kane et al. |
| 6,148,892 A | 11/2000 | Koerner et al. |
| 6,176,288 B1 | 1/2001 | Kane et al. |
| 6,209,684 B1 | 4/2001 | Kane et al. |
| 6,234,232 B1 | 5/2001 | Kane et al. |
| 6,240,994 B1 | 6/2001 | Schmitt |
| 6,463,982 B1 | 10/2002 | Doan |
| 6,467,524 B1 | 10/2002 | Ronge et al. |
| 6,502,618 B1 | 1/2003 | Kane et al. |
| 6,557,610 B1 | 5/2003 | Koerner et al. |

\* cited by examiner

APPARATUS FOR MOUNTING AND INFLATING A TIRE AND WHEEL ASSEMBLY

RELATED APPLICATION

The subject patent application claims priority to and all the benefits of U.S. Provisional Patent Application Ser. No. 60/477,882 filed on Jun. 12, 2003.

FIELD OF THE INVENTION

The subject invention relates to an apparatus for inflating and mounting a tire and wheel assembly, and more particularly to an inflator head having at least two concentric bells selectively moveable with respect to one another to inflate the tire.

BACKGROUND OF THE INVENTION

Motor vehicles are commonly supported by pneumatic tires supported on respective wheels, i.e. a tire and wheel assembly. The tire and wheel assembly is among the most important parts of the motor vehicle. Everything concerned with driving, such as moving and stopping of the motor vehicle, involves the tire and wheel assembly. It is well known that a non-uniform, i.e. improperly mounted and inflated tire and wheel assembly contributes significantly to noise and vibration of the motor vehicle. A tire and wheel assembly that is not properly mounted and inflated results in what is commonly referred to as smooth road shake, resulting in the undesirable vibration of the motor vehicle. If beads of the tire are not properly seated on seats of the wheel, air pressure over, for example 25 psi, may cause the bead to break and the tire and wheel assembly to explode during operation.

Typically, the mounting of the tire on the wheels by automobile manufacturers is normally accomplished by various high production assembly lines. These assembly lines, known in the art, contain conveying means, such as conveyor belts or metal rollers making it possible to move the tires and the wheels, respectively, from one point to another on the assembly line. The tires and wheels are delivered from a supply warehouse on suitable pallets to be further mounted on the assembly line and delivered to customers. The tires and wheels are typically treated by the lubrication solution or soap before the tire is installed on the respective wheel and is inflated.

Various methods and machines have been devised for seating the bead of the tire on or between the seats of the wheel and/or inflating the same. The objective, however, is always to ensure that the bead of the tire are properly seated on the seats of the wheel and are properly inflated to ensure proper functioning of the tire and wheel assembly. The art is replete with various methods and apparatuses for inflating and/or mounting a tire and wheel assembly, which are disclosed in the U.S. Pat. No. 4,735,250 to Kane; U.S. Pat. No. 5,339,880 to Kawabe et al.; U.S. Pat. No. 6,502,618 to Kane et al.; U.S. Pat. No. 6,463,982 to Doan; U.S. Pat. No. 6,467,524 to Ronge et al.; U.S. Pat. No. 6,148,892 to Koerner et al.; and U.S. Pat. No. 6,029,716 to Hawk and are widely used today in the automotive industry.

The U.S. Pat. No. 4,735,250 to Kane, for example, teaches a tire inflating station having a support frame, a conveyor supported and operably connected to the support frame for delivering preassembled tire on a respective wheel. An inflator device is operably connected to the support frame and includes inner and outer concentric seals with the outer concentric seals movable telescopingly relative to the inner concentric seal for inflating the tire. The tire inflating station does not teach a tool cooperable with the tire inflating station for mounting the tire about the wheel for inflating the tire and wheel assembly. The inner and outer concentric seals and the conveyor are not connected one with the other.

The U.S. Pat. No. 5,339,880 to Kawabe et al., for example, teaches a tire mounting and inflator device including a table movable upward and downward along guides by means of a reciprocating movable fluid pressure cylinder. The table supports inner and outer concentric members or seals engaged one with the other in a telescoping fashion and raised in different modes of operation to raise the inner seal into abutment against a wheel in an air-tight manner. Pressurized air is then supplied into inner space of the tire through a space between the inner and outer seals and from an air supply line connected to a pressurized air source, such as an air compressor. The inner and outer concentric seal are positioned in a stationary manner in the tire mounting and inflator device that may require to entirely disassembly the tire mounting and inflator device in order to replace or service the inner or outer concentric seals.

Other methods and devices are known and used in the automotive industry today. The Japanese Utility Model Application No. 50-104,302, for example, teaches a tire and wheel assembly mounting apparatus. Similar to the aforementioned prior art devices, in mounting a tire on a wheel with this tire and wheel assembly mounting apparatus, the wheel is arranged on a table vertically movable and fixed thereat by means of an extensible and contractible center cone inserted into the hub hole formed in the center of the wheel. The tire is then arranged on the wheel in an inclined state so that a part of one bead portion of the tire is dropped into a well formed in one side region of the rim of the wheel. By rotating a swivel arm coaxially provided on the center cone, bead portions of the tire are expanded by guide rollers provided on the swivel arm and a side surface rubber of the tire is urged downwardly by restraining rollers vertically movably provided on the swivel arm. As a result, the bead portions of the tire are fitted one by one or simultaneously on the rim of the wheel. The tire and wheel assembly mounting apparatus does not teach a tire inflator assembly having inner and outer concentric members or seals.

Hence practicable, the prior art designs are too complex, non-compact and fit only to be installed and used within established environment of a production line to lubricate and mount the tires within their respective wheels to undergo further inflation. The application of some of the aforementioned designs is limited mass production and may not be used in individually owned tire shops, located in a private garage, and the like, or at the facility with a limited space. Other designs may require service that is complicated leading to entire disassembly of the device or apparatus to replace or service parts, such as, for example inner or outer concentric seals.

But even with the aforementioned technique, to the extent it is effective, there is always need for improvements system for mounting a tire about the wheel to form a tire and wheel assembly and inflating the same.

SUMMARY OF THE INVENTION

An apparatus of the present invention is designed for assembling a tire having a pair of beads on a wheel having a pair of seats by forcing the beads of the tire between the seats of the wheel for forming a tire and wheel assembly and inflating the tire and wheel assembly. A tool of the present apparatus rotates around the tire for forcing one of the beads of the tire between the seats of the wheel during the assembly.

An inner concentric member is designed for supporting the wheel positioned. An outer concentric member circumscribes the inner concentric member and is operably connected relative to the inner concentric member. An activator is connected to the outer concentric member for moving the outer concentric member telescopingly relative to the inner concentric member for forming the fluid passage. A carriage mechanism is connected to the inner and outer concentric members for reversibly moving the inner and outer concentric members from an isolated position to the tool. A work surface, i.e. platform supports the carriage mechanism and includes a pair of opposite tracks with the carriage mechanism disposed in the track for facilitating slidable motion of the carriage mechanism relative to the platform. A driving device cooperably interconnects the platform and the carriage mechanism to move the carriage mechanism and the inner and outer concentric members form the isolated position to the tool and to return the carriage from the tool back to the isolated position.

An advantage of the present invention is to provide an improved design of an apparatus for mounting and inflating a tire and wheel assembly that is compact and has a wide application range from an individually owned tire shop, a private garage, or the like.

Another advantage of the present invention is to provide an apparatus capable of accommodating a wide variety of wheel and tire sizes without modifying the inflator assembly.

Still another advantage of the present invention is to provide high production tire inflating and mounting apparatus capable of rapidly inflating a tire and wheel assembly supported on inner and outer concentric members or seals, which are operably connected and supported by a carriage mechanism movably from an isolated position to and away from a tool or mating device after the tire and wheel assembly is mounted and inflated.

Still another advantage of the present invention is to provide an improved design of a tire inflating and mounting apparatus that is not complex and bulky in design and integrates inner and outer concentric members with a carriage mechanism thereby reducing number of parts.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
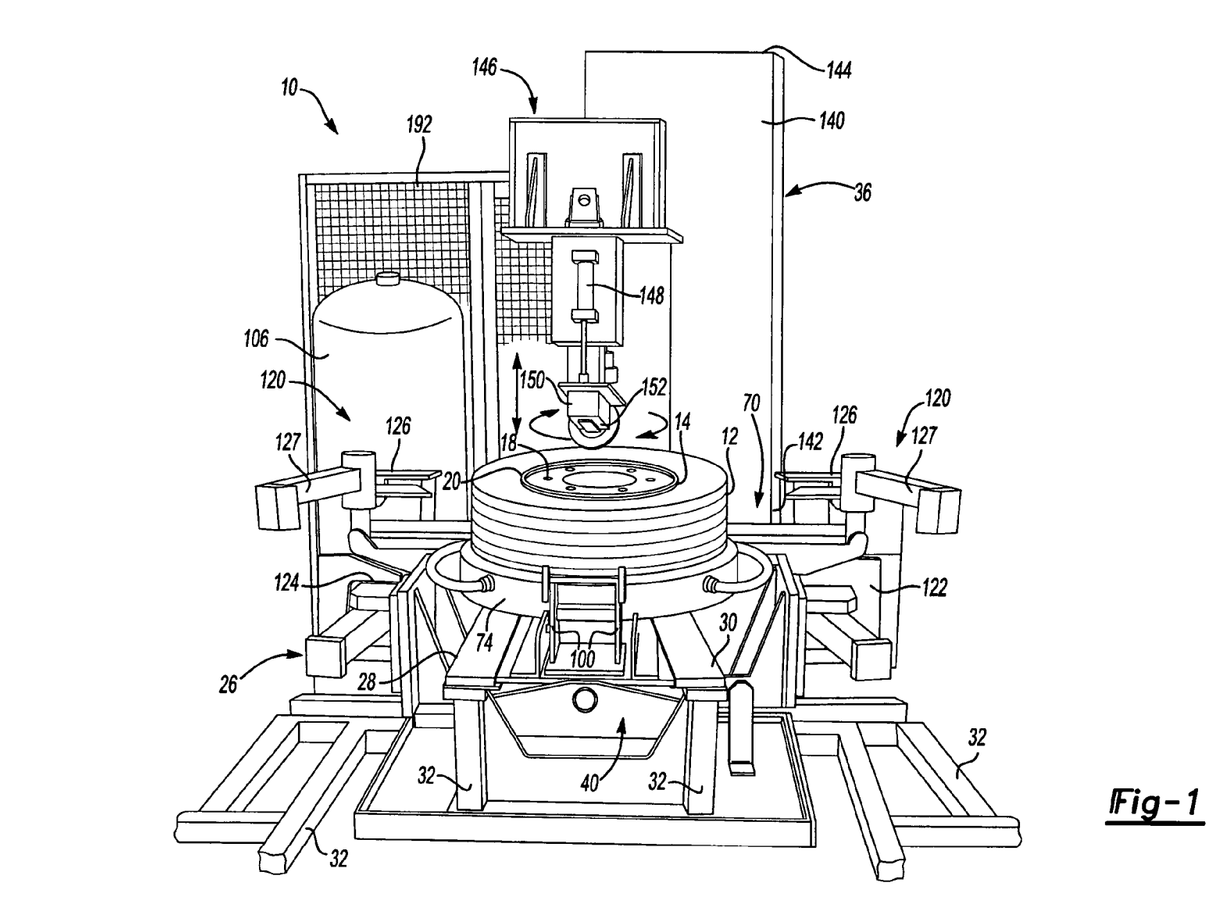
FIG. 1 is a perspective front view of an apparatus for mounting and inflating a tire and wheel assembly.
Figure 2:
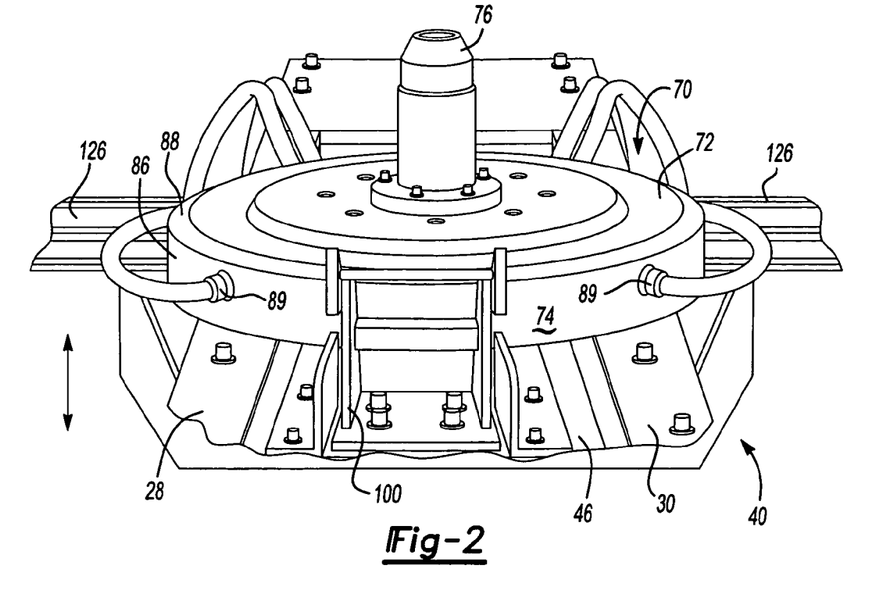
FIG. 2 is a perspective fragmental view of inner and outer concentric members connected to a carriage mechanism of the apparatus.
Figure 4:
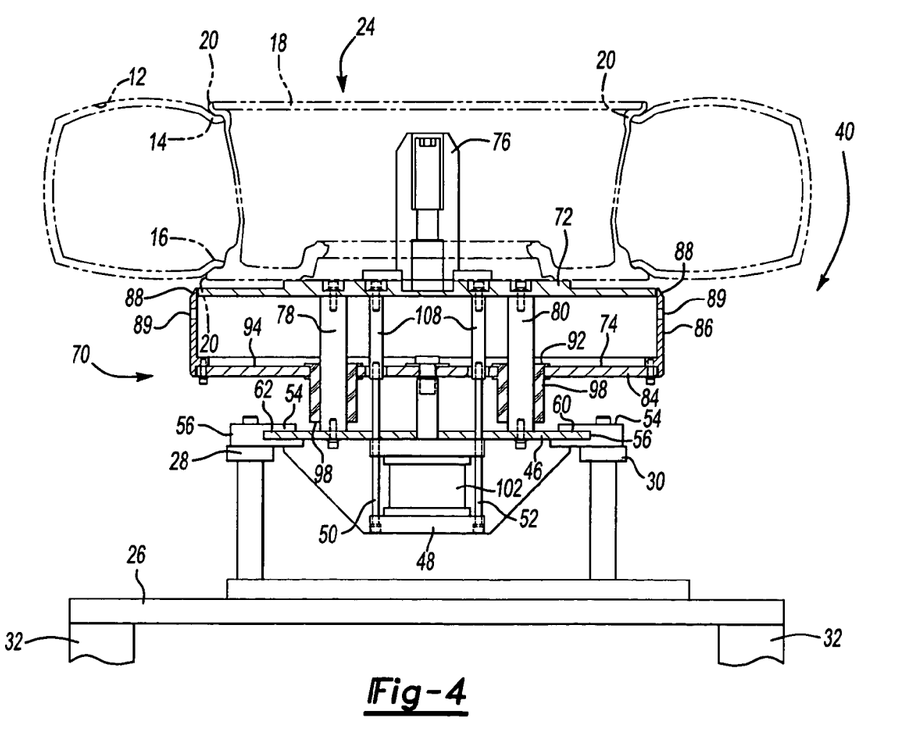
FIG. 4 is a cross sectional view of the inner and outer concentric members connected to the carriage mechanism with the outer concentric member shown in a non-inflating position.

Referring to the FIG. 1, wherein like numerals indicate like or corresponding parts, an apparatus of the present invention is generally shown at 10. The apparatus 10 is designed for assembling a tire 12 having a pair of beads 14, 16 on a wheel 18 having a pair of seats 20, 22 by forcing the beads 14, 16 of the tire 12 between the seats 20, 22 of the wheel 18. The apparatus 10 includes a work surface defined by a frame, generally shown at 26, which has opposite side walls 28, 30 and a plurality of supports 32, as best shown in FIG. 4, extending downwardly from the frame 26 to a floor 34. A tool or robotic apparatus, generally shown at 36 in FIG. 1, is adjacently positioned by the frame 26, and will be discussed in greater detail, as the description of the present invention proceeds.

The carriage mechanism 40 is designed for moving the tire and the wheel assembly 24 from an isolated position 42 (FIG. 6) where, for example, an operator 44 is positioned, to the tool 36 and retracting the tire 12 assembled with the wheel 18 back to be removed by the operator 44. The carriage mechanism 40, best shown in FIGS. 2–5, includes an upper carriage plate 46 and a lower carriage plate 48 interconnected and spaced apart by at least two posts 50, 52. The upper carriage plate 46 is slidably disposed within the frame 26. A pair of spaced rails 54, 56 are connected to the aforementioned opposite walls 28, 30 of the frame 26 to define tracks, generally indicated at 60, 62. The upper carriage plate 46 is slidably disposed in the tracks 60, 62 for facilitating slidable motion of the upper carriage plate 46 relative to the frame between the isolated position 42 and the tool 36. The tracks 60, 62 are constantly lubricated by methods known to those skilled in the art to reduce frictional forces between the upper carriage plate 46 and the tracks 60, 62.

Figure 5:
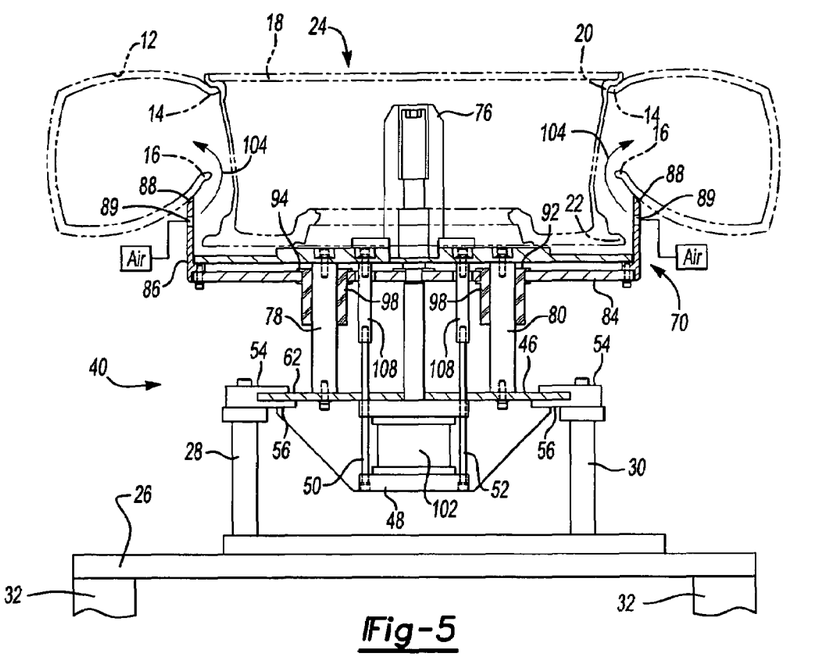
FIG. 5 is a cross sectional view of the inner and outer concentric members connected to the carriage mechanism with the outer concentric member shown in a tire inflating position.

As best shown in FIGS. 4 and 5, the carriage mechanism 40 is operably connected to an inflator assembly, generally shown at 70. The inflator assembly 70 includes inner 72 and outer 74 concentric members or seals. The inner concentric member 72 supports the wheel 18 from below. A post 76 is integral with and extends upwardly from the inner concentric member 72 for holding the wheel 18 in place in operation of the apparatus 10. A pair of links 78, 80 interconnect the inner concentric member 72 with the upper carriage plate 46. The outer concentric member 74 of the inflator assembly 70 is telescopingly movable relative to the inner concentric member 72.

The outer concentric member 74 surrounds the inner concentric member 72 and defines an alignment axis A with the tool 36 as the inner 72 and outer 74 concentric members are positioned below the tool 36. The outer concentric member 74 includes a tubular configuration and has base plate 84 and an annular wall 86 extending upwardly from the base plate 84 to an annular beveled edge 88. A plurality of fluid passage ports 89 are defined in and are radially disposed in the annular wall 86. The fluid passage ports 89 are adaptable for receiving and inflating the tire 12 mounted on the wheel 18 in operation of the apparatus 10. The base plate 84 includes a pair of apertures 92, 94 defined therein to surround the links 78, 80. A bearing 98 is disposed between each of the apertures 92, 94 and the links 78, 80 for preventing frictional engagement between the links 78, 80 and the outer concentric member 74 for facilitating slidable movement of the outer concentric member 74 relative to the links 78, 80. A support shoe 100, integral with and adjacent the outer concentric member 74, is designed to lock the tire 12 in place and to prevent the tire 12 from sliding beyond the support shoe 100 at which point the tire 12 is about to engage with the wheel 18 positioned on the inner concentric member 72.

An actuator 102 is operably connected to the outer concentric member 74 to move the outer concentric member 74 telescopingly relative to the inner concentric member 72 for forcing the other of the beads of the tire 12 between the seats of the wheel 18 thereby forming a fluid passage 104. The actuator 102 is disposed between the upper 46 and lower 48 carriage plates and is connected to a source of fluid passage supply, such as, for example, an air supply, shown at 106 in FIG. 1. Preferably, the actuator 102 is "LP" type "Parker Air Cylinder". The actuator 102 is fluidly connected with the air supply 106. Alternatively, the actuator 102 may include a back-up source of fluid supply (not shown). Those skilled in the actuator art will appreciate that other actuators may be employed in the present inventive concept to move the outer concentric member 74 relative to the inner concentric member 72. These other actuators include and are not limited to electric, hydraulic actuators, and the like. A pair of guide members 108 are connected to and extending from the inner concentric member 72. The guide members 108 are operably engaged with the activator 102 for facilitating alignment between the inner 72 and outer 74 concentric members as the outer concentric member 74 moves telescopingly relative to the inner concentric member 72.

Figure 3:
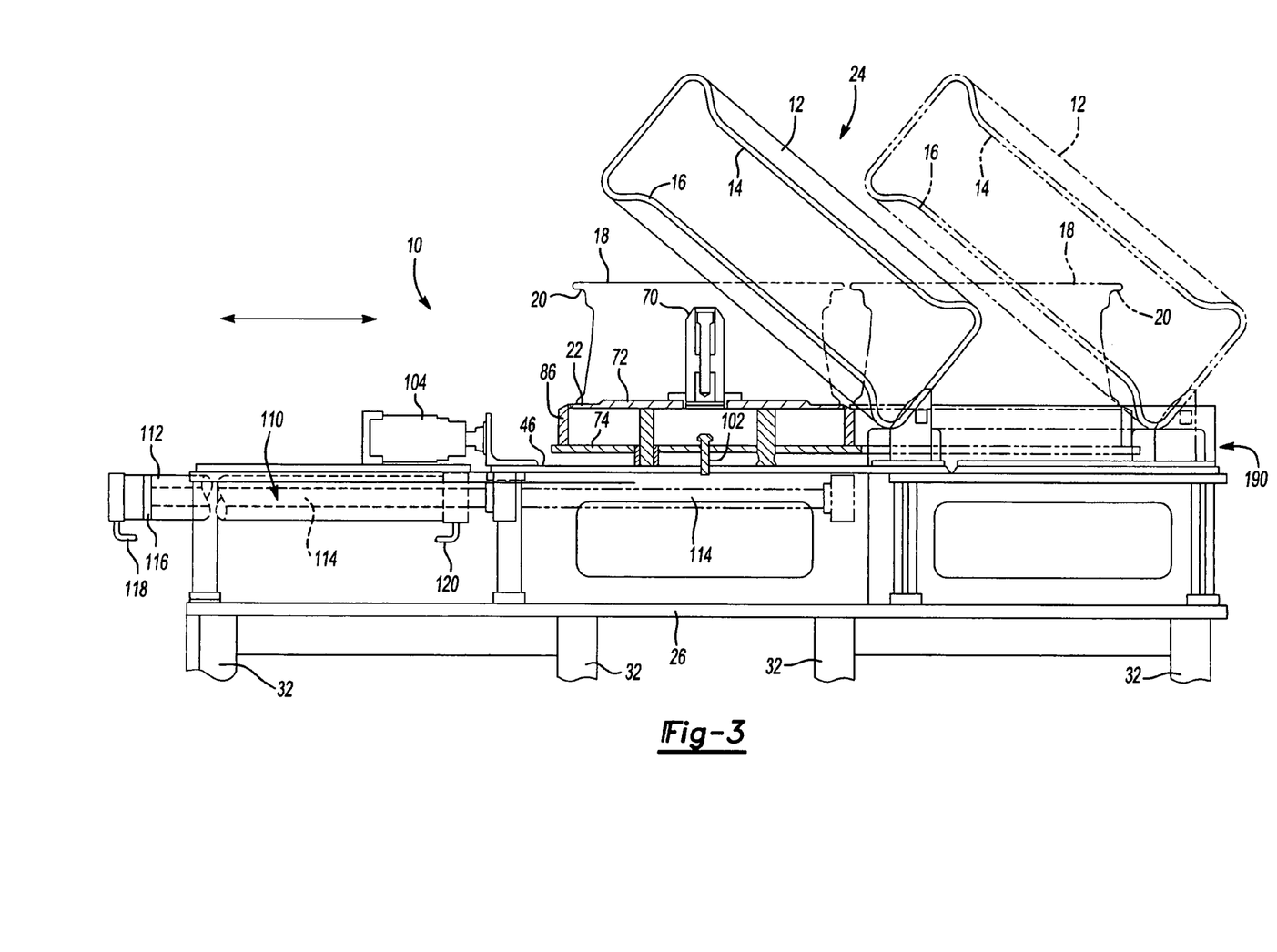
FIG. 3 is a side view of the inner and outer concentric members connected to the carriage mechanism slidably disposed on a platform.

A driving device or mechanism, generally indicated at 110 in FIG. 3, is connected to the upper carriage plate 46 of the carriage mechanism 40 for moving the inner 72 and outer 74 concentric members between the isolated position 42 and the alignment axis A. Preferably, the driving mechanism 110 may include "2A" Series "Parker Air Cylinder". Typically, the driving mechanism 110 may present a housing 112 having a rod 114 connected to the upper carriage plate 46 and a piston 116 disposed in the housing 112. Inward 118 and outward 120 ports are defined in the housing 112. Inward and outward pressure lines (not shown) are operably connected to the inward 118 and outward 120 ports, respectively. The outward pressure line pulls air out of the housing 112, thereby reducing air pressure, i.e. P1 inside the housing 112 to move the piston 116 inwardly. In addition, the inward pressure line forces air into the housing 112 increasing the air pressure, i.e. P2 inside the housing 112 thereby moving the piston 116 outwardly. If P1 is higher than P2, the rod 114 is pushed outwardly from the housing 112, thereby moving the carriage mechanism 40 away from the tool 36 to the isolated position 42. However, if P1 is less than P2, the rod moves the carriage mechanism 40 from the isolated position 42 to the tool 36. The driving mechanism 110 is fluidly connected with the air tank 106. Those skilled in the mechanical art will appreciate that various other mechanical devices may be used for moving the carriage mechanism 40 relative to the tool 36 from the isolated position 42. These other mechanical devices include and are not limited to electric, hydraulic, or the like. A pair of amortization devices, only one shown at 109, are connected to the frame to accommodated soft engagement of the carriage mechanism 40 with the frame 26 as the carriage mechanism 40 moves between the tool 36 and the isolated position 42.

Figure 6:
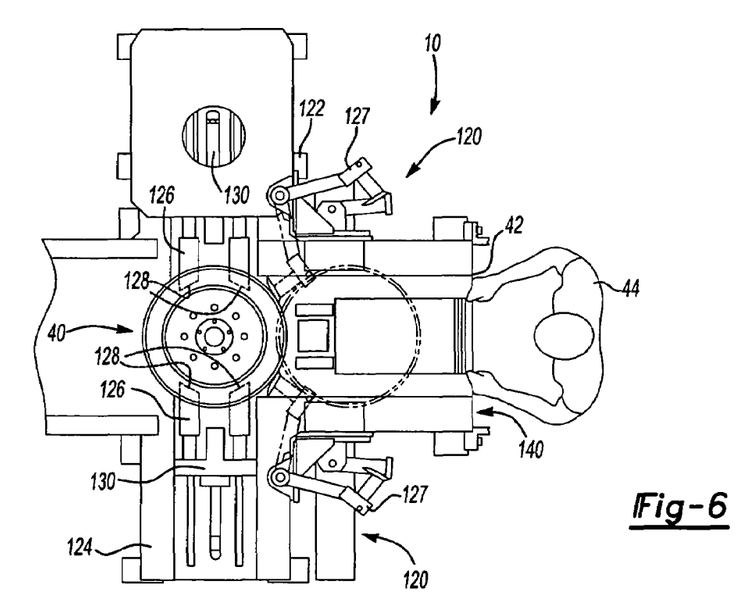
FIG. 6 is a top and partial view of the apparatus, shown in FIG. 1, which shows an operator at an isolated position and positions of the inner and outer concentric members relative the operator and the platform.

As best shown in FIGS. 1 and 6, a locking system, generally shown at 120, is supported on a pair of outlet sections 122, 124 are attached to the frame 26 extending outwardly in a cantilevered fashion from and perpendicularly to the frame 26. The locking system 120 includes a pair of spaced forks 126 and a pair of arms or grippers 127. The spaced forks 126 are operably connected to each of the outlet sections 122, 124. The spaced forks 126 present a distal end 128 having a configuration complementary to circular configuration of the wheel 18. The spaced forks 126 are movable along the outlet sections 122, 124 to the frame 26 for holding and prevent relative movement of the inner 72 and outer 74 concentric members relative to the frame 26 as the tool 36 rotates around the tire 12 for forcing one of the beads 14 of the tire 12 between the seats 20, 22 of the wheel 18. The distal ends 128 of each fork 126 abuts the lower of the seats 20, 22 of the wheel 18 to prevent relative movement of the wheel 18 as the tool 36 forces one of the beads 14 of the tire 12 between the seats 20, 22 of the wheel 18. Preferably, the spaced forks 126 are moved to and away from the wheel 18 positioned on the inner 72 and outer 74 concentric members by a second actuating mechanism 130 that may include "2A" Series "Parker Air Cylinder". The functional aspects of the second actuating mechanism 130 are similar to the aforementioned driving mechanism 110. The second actuating mechanism 130 is fluidly connected with the air tank 106. Those skilled in the mechanical art will appreciate that various other mechanical devices used for moving the spaced forks 126 relative to the frame 26 may be employed in the present inventive concept. These other mechanical devices include and are not limited to electric, hydraulic, or the like.

The arms or grippers 127 of the locking system 120 are spaced apart and are pivotably connected to the opposite walls 28, 30 of the frame 26, respectively, for holding the tire 12 relative to the wheel 18 and preventing relative movement of the tire 12 with respect to the wheel 18 as the tool 36 rotates around the tire 12. The grippers 127 move toward a central line of the frame 26 and beyond the frame 26 with respect to different modes of operation of the grippers 127.

Figure 7:
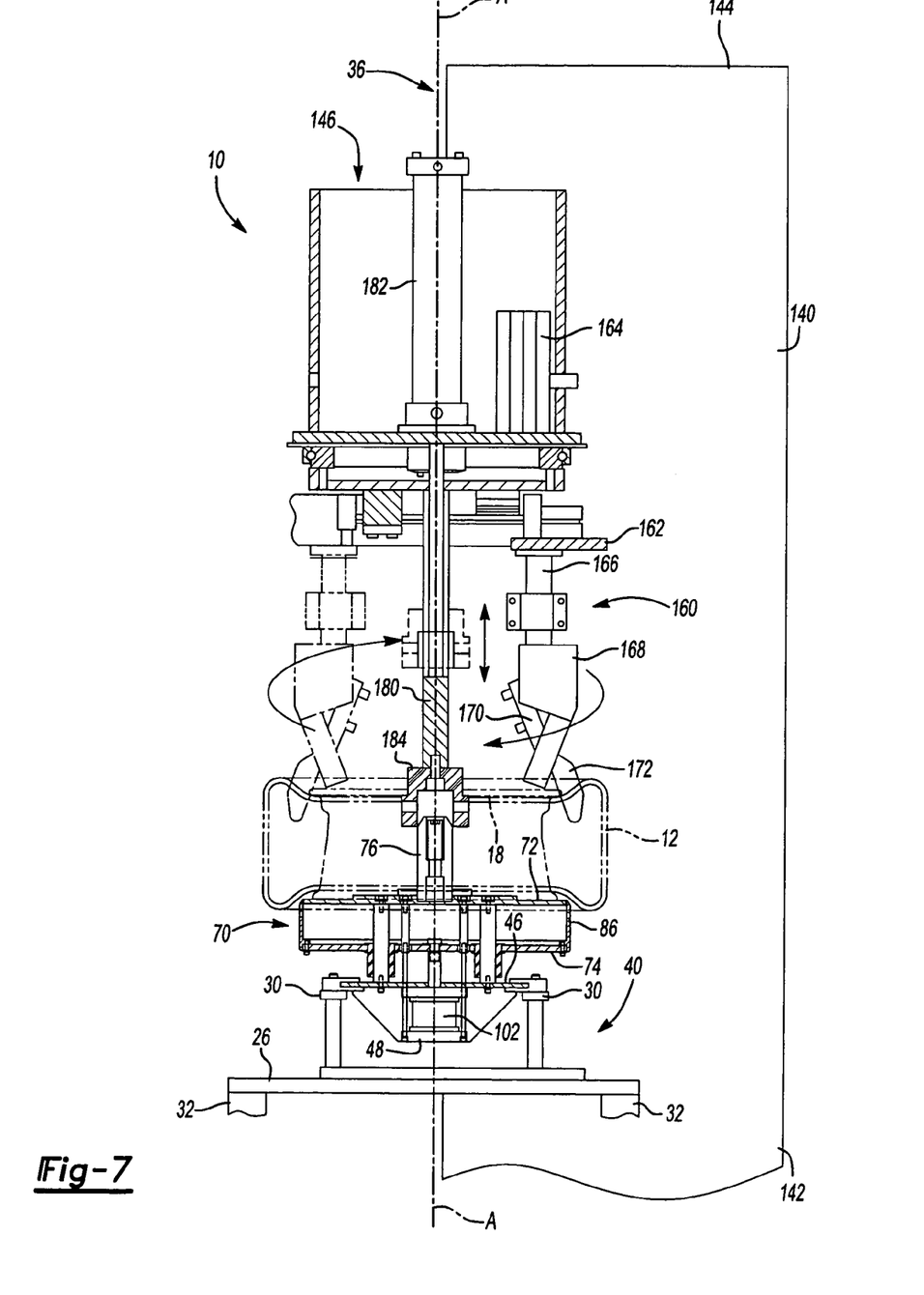
FIG. 7 is a partially cross sectional and fragmental view of the tire and wheel assembly positioned on the inner and outer concentric members with a tool positioned above the tire and wheel assembly and rotatable around the tire for forcing one of the beads of the tire between the seats of the wheel.

Referring to FIG. 7, the tool 36 has a tower 140 that includes bottom 142 and upper 144 terminal ends. A sealant section, generally shown at 146, is operably connected to the tower 140 and is slidably movable along the tower 140 between the bottom 142 and upper 144 terminal ends in different operational modes. An air cylinder 148 is connected to the sealant section 146. As appreciated by those skilled in the art, the functional aspects of the air cylinder 148 are similar to the aforementioned driving mechanism 110.

As best shown in FIG. 1, a pushing device, i.e. pusher, shown at 150 in FIG. 1, is operably connected to the air cylinder 148 and includes a foot 152. The pushing device 150 moves axially to and from the tire and wheel assembly 26 for locking and preventing movement of the tire 12 relative to the wheel 18 in different operational modes of the sealant section 146.

The apparatus 10 includes sealer device, generally indicated at 160. A shoulder 162 of the sealer device 160 is operably connected to a motor 164 housed in the sealant section 146. The motor 164 provides a power source to the sealer device 160 thereby rotating the sealer device 160 radially about the alignment axis A and about the pusher device 150. The sealer device 160 includes a central shaft 166 with the shoulder 162 connected thereto. A roller 168 of the sealer device 160 includes an arm 170 having a sealing wheel 172. The arm 170 is connected angularly with respect to the alignment axis A. The sealing wheel 172 is rotatable circumferentially about the alignment axis A and relative to the pusher 150 for forcing the beads 14, 16 of the tire 12 between the seats 20, 22 of the wheel.

A slide or sliding device 180 is operably connected to the sealant section 146 powered by another air cylinder 182 operated similar to the air cylinder 148. A cup 184 is connected to the slide 180 for complementing with the post 76 extending from the inner concentric member 72. The sliding device 180 is designed for sliding axially to and from the wheel 18 for forcing the wheel 18 to the inner concentric member 72 when the roller 168 rotates circumferentially relative to the alignment axis A. The sliding device 180 prevents radial movement of the wheel 18 relative to the inner concentric member 72.

Preferably, a controller (not shown) is connected to the apparatus 10. The controller is in electronic communication with the driving device 110, the tool 36, the actuator 102 for operating the outer concentric member 74, and the locking device of the apparatus 10. The controller includes a computer having an input/output interface, a central processor unit, a random access memory, i.e. RAM, and a read only memory, i.e. ROM. The input interface is electrically connected with the driving device 110, the tool 36, the actuator 102 for operating the outer concentric member 74, and the locking device of the apparatus 10. The controller is pre-programmed with the various tire 12 and wheel 18 sizes to be mounted and inflated. The ROM stores a program, i.e. a comparative software that determines proper amount of air to be inflated into particular tire 12 mounted on the wheel 18. The controller is preferably installed at a operational point, generally indicated at 190. Alternatively, the controller may be positioned adjacent the frame 26. A protective screen 192 surrounds the apparatus 10.

In operation, the tire 12 and wheel 18 are placed by the operator 44 on the inner concentric member 72 located at the isolated position 42 with the tire 12 oriented in an angular position relative to the wheel 18 supported by the inner concentric member 72. When the cycle begins, the carriage mechanism 40 operated by the driving device 110, moves the inner 72 and outer 74 concentric members from the isolated position 42 to and below the tool 36 with the inner 72 and outer 74 concentric members and the tool 36 defining the alignment axis A. The spaced forks 126 extend from the respective outlet section 122, 124 in the direction of the frame 26 to hold the wheel 18 on the inner concentric member 72 and to prevent even slight relative movement of the wheel 18. The grippers 127 are pivotable rotated to hold the tire 12 in place, in addition to the support shoe 100, which prevent movement of the tire 12 beyond the outer concentric member 74. The sealant section 146 is moved downwardly to seal the tire about the wheel. As the sealant section 146 approaches the inner 72 and outer 74 concentric members with the tire 12 and the wheel 18 positioned thereon, the pusher 150, powered by the air cylinder, extends downwardly from the sealant section 146 to hold the tire 12 at a point where the tire 12 is engaged with the support shoe 100 to prevent the wheel 18 from sliding backwards and forwards during sealing procedure in addition to the grippers 127, which prevent the tire 12 from sliding sidewise.

The sliding device 180, operably connected to the sealant section 146 and powered by another air cylinder engaged the hub portion (not shown) of the wheel 18. The sealer device 160 begins sealing cycle by rotating radially about the alignment axis A and about the pusher 150 device for forcing the beads of the tire 12 between the seats 20, 22 of the wheel 18. The sealer device 160 makes a circle of about 330 degree around the alignment axis A to completely force the bead 14 of the tire 12 between the seats 20, 22 of the wheel 18. When the sealer device 160 aligns with the pusher 150, the spaced forks 126 and the grippers are disengage from the tire 12 and are return to their initial positions, respectively. As the spaced forks 126 and the grippers 127 are retracted, the sealant section 146 is retracted upwardly leaving only the sealer device 160 in a frictional engagement with the tire 12 mounted on the wheel 18 at which point the sealer device 160 continuous to rotate about the alignment axis A to provide a second or a control seal.

In summary, the sealer device 160 makes two circles around the alignment axis A to completely seal or mount the tire 12 about the wheel 18. The actuator 102 operably connected to the outer concentric member 74 moves the outer concentric member 74 telescopingly relative to the inner concentric member 72 for forcing the lower bead 16 of the tire 12 between the seats 20, 22 of the wheel 18 to form the fluid passage 104. Air delivered from the air tank 106 through the plurality of the fluid passage ports 89 defined in the annular wall fills the tire 12. When the tire and wheel assembly 24 is mounted and inflated, the carriage mechanism 40 returns the same to the isolated position 42. The operator 44 removed the inflated tire and wheel assembly 24 to begin a new cycle begins.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for mounting a tire having a pair of beads on a wheel having a pair of seats to form a tire and wheel assembly and inflating the tire and wheel assembly, said apparatus comprising:

a tool for rotating around the tire for forcing one of the beads of the tire between the seats of the wheel;

an inner concentric member for supporting the tire and wheel assembly;

an outer concentric member surrounding said inner concentric member and defining an alignment axis with said tool;

an actuator operably connected to said outer concentric member to move said outer concentric member telescopingly relative to said inner concentric member for forcing the other of the beads of the tire between the seats of the wheel thereby forming a fluid passage;

a work surface for supporting said inner and outer concentric members; and a carriage mechanism operably connected to and supporting said inner and outer concentric members for moving said inner and outer concentric members with the tire and wheel positioned thereon along said work surface from an isolated position to said alignment axis and retracting said inner and outer concentric members back to said isolated position as the tire and wheel assembly is inflated.

2. An apparatus as set forth in claim 1 wherein said carriage mechanism further includes a driving device for moving said carriage mechanism on said work surface between said isolated position and said tool.

3. An apparatus as set forth in claim 2 wherein said driving device further includes a housing and a rod engaged in and slidably movable in said housing with respect to different operational modes of the driving device.

4. An apparatus as set fort in claim 3 wherein said carriage mechanism is further defined by upper and lower carriage plates spaced from the and interconnected one with the other with said actuator positioned between said upper and lower carriage plates with said upper carriage plate connected to said rod.

5. An apparatus as set fort in claim 4 including a pair of links inter connecting said upper carriage plate and said inner concentric member.

6. An apparatus as set forth in claim 5 wherein said outer concentric member includes a tubular configuration having a base plate and an annular wall extending from said base plate.

7. An apparatus as set forth in claim 6 including a plurality of fluid ports defined in said annular wall adaptable for receiving and inflating the tire mounted on the wheel.

8. An apparatus as set forth in claim 7 wherein said upper carriage plate includes a pair of apertures defined therein to surround said links.

9. An apparatus as set forth in claim 8 including a bearing disposed between each of said apertures and said links for preventing frictional engagement between said links and said upper carriage plate and facilitating slidable movement of said upper carriage plate relative to said links.

10. An apparatus as set forth in claim 9 including a pair of guide members connected to and extending from said inner concentric member and operably engaging with said activator for facilitating alignment between said inner and outer concentric members as said outer concentric member moves telescopingly relative to said inner concentric member.

11. An apparatus as set forth in claim 10 including a post integral with and extending upwardly from said inner concentric member for holding the wheel in place.

12. An assembly as set forth in claim 11 including a support shoe integral with and connected to said upper carriage plate with said support shoe adjacent said outer concentric member for locking the tire in place and preventing the tire from sliding beyond said support shoe.

13. An assembly as set forth in claim 12 including a pair of spaced rails connected to opposite walls of said work surface to define a track to receive said upper carriage plate slidably disposed in said track for facilitating slidable motion of said upper carriage plate relative to said work surface between said isolated position and said tool.

14. An apparatus as set fort in claim 13 including a pair of arms spaced from one another and pivotably connected to said opposite walls of said worksurface for holding the tire relative to the wheel and preventing relative movement of the tire with respect to the wheel as said tool rotates around the tire for forcing one of the beads of the tire between the seats of the wheel.

15. An apparatus as set fort in claim 14 including a pair of forks spaced one from the other and operably connected to said work surface with said forks movable along said work surface to said inner and outer concentric members for holding and prevent relative movement of said inner and outer concentric members relative to said work surface as said tool rotates around the tire for forcing one of the beads of the tire between the seats of the wheel.

16. An apparatus as set fort in claim 15 wherein said tool further includes a pusher for sliding axially to and from the tire and wheel assembly for locking and preventing movement of the tire relative to the wheel.

17. An apparatus as set fort in claim 16 wherein said tool further includes a sealer having a shaft and a roller positioned angularly with respect to said shaft and rotatable with said shaft circumferentially about said alignment axis and relative to said pusher for forcing the beads between the seats.

18. A apparatus as set forth in claim 17 wherein said tool further includes a slide for sliding axially to and from the wheel for forcing the wheel to said inner concentric member when said roller rotates circumferentially relative to said alignment axis and for preventing radial movement of the wheel relative to said inner concentric member.

19. A tire inflating and mounting apparatus including a frame and a tool for rotating around a tire having a pair of beads positioned on a wheel having a pair of seats for forcing one of the beads of the tire between the seats of the wheel to form a tire and wheel assembly and inflating the tire and wheel assembly, said tire inflating and mounting apparatus comprising:
 an inflator assembly for supporting and inflating the tire and wheel assembly and for defining an alignment axis with the tool;
 an actuator operably connected to said inflator assembly for forcing the other of the beads of the tire between the seats of the wheel thereby forming a fluid passage; and
 a carriage mechanism operably connected to and supporting said inflator assembly for moving said inflator assembly with the tire and wheel positioned thereon from an isolated position to said alignment axis and retracting said inflator assembly back to said isolated position as the tire and wheel assembly is inflated.

20. An apparatus as set forth in claim 19 wherein said carriage mechanism further includes a driving device connected to said carriage mechanism for moving said carriage mechanism on said work surface between said isolated position and said tool.

21. An apparatus as set fort in claim 20 wherein said carriage mechanism is further defined by upper and lower carriage plates spaced from the and interconnected one with the other with said actuator positioned between said upper and lower carriage plates with said upper carriage plate connected to said rod.

22. An apparatus as set forth in claim 21 wherein said inflator assembly further includes an inner concentric member for supporting the tire and wheel assembly.

23. An apparatus as set forth in claim 22 wherein said inflator assembly further includes an outer concentric member surrounding said inner concentric member and for defining an alignment axis with the tool.

24. An apparatus as set fort in claim 23 wherein said inflator assembly including a pair of links inter connecting said upper carriage plate and said inner concentric member.

25. An apparatus as set forth in claim 24 wherein said outer concentric member includes a tubular configuration having a base plate and an annular wall extending from said base plate.

26. An apparatus as set forth in claim 25 including a plurality of fluid ports defined in said annular wall adaptable for receiving and inflating the tire mounted on the wheel.

27. An apparatus as set forth in claim 7 wherein said upper carriage plate includes a pair of apertures defined therein to surround said links.

28. An apparatus as set forth in claim 27 including a bearing disposed between each of said apertures and said links for preventing frictional engagement between said links and said upper carriage plate and facilitating slidable movement of said upper carriage plate relative to said links.

29. An apparatus as set forth in claim 28 including a pair of guide members connected to and extending from said inner concentric member and operably engaging with said activator for facilitating alignment between said inner and outer concentric members as said outer concentric member moves telescopingly relative to said inner concentric member.

30. An apparatus as set forth in claim 29 including a post integral with and extending upwardly from said inner concentric member for holding the wheel in place.

31. An integrated tire mount and inflate assembly for mounting the tire on a wheel and inflating the tire and wheel assembly, comprising:
 a concentric inflator assembly capable of inflating multiple tire sizes;
 a mounting apparatus affixed to a supporting frame, wherein said mounting apparatus provides a force to the tire in a circumferential direction thereby mounting the tire on the wheel; and
 a carriage assembly cooperable with said supporting frame for moving the tire and the wheel from a first position wherein the tire and wheel are inserted and removed from the tire mount and inflate assembly and a second position wherein the tire is mounted to the wheel with said mounting apparatus and the tire and wheel assembly is inflated by said concentric inflator assembly.

* * * * *